United States Patent
Gawor et al.

(10) Patent No.: US 8,589,433 B2
(45) Date of Patent: Nov. 19, 2013

(54) DYNAMIC TAGGING

(75) Inventors: Jaroslaw Gawor, Apex, NC (US); Paul Franklin McMahan, Apex, NC (US); Andrew Lewis Schirmer, Andover, MA (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/603,171

(22) Filed: Oct. 21, 2009

(65) Prior Publication Data

US 2011/0093489 A1  Apr. 21, 2011

(51) Int. Cl.
*G06F 17/30* (2006.01)

(52) U.S. Cl.
USPC .......... 707/770; 707/758; 706/11; 706/12; 706/14; 715/200

(58) Field of Classification Search
None
See application file for complete search history.

(56) References Cited

U.S. PATENT DOCUMENTS

| | | | | |
|---|---|---|---|---|
| 5,835,712 | A * | 11/1998 | DuFresne | 709/203 |
| 6,061,698 | A * | 5/2000 | Chadha et al. | 715/207 |
| 6,070,167 | A * | 5/2000 | Qian et al. | 1/1 |
| 6,192,380 | B1 * | 2/2001 | Light et al. | 715/207 |
| 6,334,111 | B1 * | 12/2001 | Carrott | 705/14.39 |
| 6,732,331 | B1 * | 5/2004 | Alexander | 715/234 |
| 6,820,075 | B2 | 11/2004 | Shanahan et al. | |
| 7,032,174 | B2 * | 4/2006 | Montero et al. | 715/257 |
| 7,580,363 | B2 * | 8/2009 | Sorvari et al. | 370/252 |
| 7,747,690 | B2 * | 6/2010 | Kraenzel et al. | 709/206 |
| 7,885,986 | B2 * | 2/2011 | Anderson et al. | 707/805 |
| 7,912,860 | B2 * | 3/2011 | Flaks et al. | 707/790 |
| 7,958,197 | B2 * | 6/2011 | Hughes et al. | 709/206 |
| 2002/0019825 | A1 | 2/2002 | Smiga et al. | |
| 2003/0033288 | A1 * | 2/2003 | Shanahan et al. | 707/3 |
| 2003/0093483 | A1 * | 5/2003 | Allen et al. | 709/207 |
| 2004/0039988 | A1 * | 2/2004 | Lee et al. | 715/505 |
| 2004/0078488 | A1 * | 4/2004 | Patrick | 709/245 |
| 2005/0113066 | A1 * | 5/2005 | Hamberg | 455/411 |
| 2005/0257134 | A1 * | 11/2005 | Goodman et al. | 715/507 |
| 2006/0059434 | A1 * | 3/2006 | Boss et al. | 715/780 |
| 2006/0206801 | A1 * | 9/2006 | Maxwell et al. | 715/507 |
| 2006/0224553 | A1 * | 10/2006 | Chtcherbatchenko et al. | 707/1 |
| 2007/0016575 | A1 * | 1/2007 | Hurst-Hiller et al. | 707/5 |
| 2007/0067331 | A1 * | 3/2007 | Schachter et al. | 707/102 |
| 2007/0078832 | A1 * | 4/2007 | Ott et al. | 707/3 |
| 2007/0079009 | A1 * | 4/2007 | Cama | 709/246 |
| 2007/0162546 | A1 * | 7/2007 | McLaughlin | 709/204 |
| 2008/0065995 | A1 * | 3/2008 | Bell et al. | 715/751 |

(Continued)

OTHER PUBLICATIONS

Song et al, "Real-time Automatic Tag Recommendation", ACM, 2008.*

(Continued)

*Primary Examiner* — Hung Le
(74) *Attorney, Agent, or Firm* — Steven L. Nichols; Van Cott, Bagley, Cornwall & McCarthy P.C.

(57) ABSTRACT

A method for dynamic tagging includes receiving input of a name of at least one tag into an information object implemented by an application that is executed by a computer system that is in communication with at least one tag repository external to the application; querying the at least one tag repository for the tag with the application executed by the computer system; and responsive to receiving at least one match from the at least one tag repository, incorporating the content into the information object with the application.

16 Claims, 5 Drawing Sheets

(56) References Cited

U.S. PATENT DOCUMENTS

| | | | |
|---|---|---|---|
| 2008/0066020 A1* | 3/2008 | Boss et al. | 715/968 |
| 2008/0120257 A1* | 5/2008 | Goyal et al. | 706/12 |
| 2008/0184100 A1* | 7/2008 | Selig | 715/225 |
| 2008/0220798 A1 | 9/2008 | Potluri et al. | |
| 2008/0267505 A1* | 10/2008 | Dabet et al. | 382/181 |
| 2008/0276097 A1* | 11/2008 | Ramaswamy | 713/183 |
| 2008/0282198 A1* | 11/2008 | Brooks et al. | 715/854 |
| 2008/0320411 A1 | 12/2008 | Chen et al. | |
| 2009/0100427 A1 | 4/2009 | Loos | |
| 2009/0112847 A1* | 4/2009 | Sim et al. | 707/5 |
| 2009/0119370 A1* | 5/2009 | Stern et al. | 709/206 |
| 2009/0144254 A1* | 6/2009 | O'Sullivan et al. | 707/5 |
| 2009/0144297 A1* | 6/2009 | Lyle et al. | 707/100 |
| 2009/0222755 A1* | 9/2009 | Drieschner | 715/776 |
| 2009/0276709 A1* | 11/2009 | Venneman et al. | 715/716 |
| 2010/0131373 A1* | 5/2010 | Kubasov | 705/14.73 |
| 2010/0191721 A1* | 7/2010 | Murthy | 707/723 |
| 2010/0250524 A1* | 9/2010 | Hu et al. | 707/723 |

OTHER PUBLICATIONS

Harish, Evo2.6, http://www.go-evolution.org/Evo2.6#Autocompletion_and_name_selector_dialog_related_changes.

Stephen Farrell, Fringe Contacts: People-Tagging for the Enterprise, Proceedings of the WWW 2006 Collaborative Web Tagging Workshop (2006), IBM.

Stephen Farrell, Socially Augmenting Employee Profiles with People-Tagging, Proceedings of the 20th annual ACM symposium on User interface software and technology, USA, IBM.

Ilan Shapira, Custom Auto Complete for Visual C++ 6, http://www.codeproject.com/KB/macros/Custom_Auto_Complete.aspx.

* cited by examiner

DYNAMIC TAGGING

BACKGROUND

Aspects of the present invention relate to the tagging of electronic data. More specifically, aspects of the present invention relate to a dynamic tagging application.

Providing all the information necessary to fill out various electronic forms such as electronic documents, emails, meeting invitations etc. can often be a time consuming task. The task becomes especially time consuming if information needs to be gathered from a relatively wide variety of sources. For example, writing an email to a group of people can involve gathering information from contact lists, mapping websites, and other sources of information. One tool used to assist people in such tasks is a tag. A tag is a keyword or term that is used to represent or identify a piece of content such as a web address, an electronic file, an image, or a list of variables. Tags can be used to save time in some circumstances. However, tags are often limited to a specific data type or to a specific service.

BRIEF SUMMARY

A method for dynamic tagging includes receiving input of a name of at least one tag into an information object implemented by an application that is executed by a computer system that is in communication with at least one tag repository external to the application; querying the at least one tag repository for the tag with the application executed by the computer system; and responsive to receiving at least one match from the at least one tag repository, incorporating the content into the information object with the application.

A dynamic tagging system includes a computer system having at least one processor configured to execute software stored on a computer readable storage medium. The software is configured to cause the at least one processor to do the following upon execution of the software: allow a user to enter a name of at least one tag into an information object, query at least one tag repository external to the application for the at least one tag, responsive to receiving at least one match in the at least one repository, retrieve content identified by the at least one tag from the at least one tag repository, and incorporate content into the information object.

A computer program product for dynamic tagging includes a computer readable storage medium having computer readable code embodied therewith. The computer readable program code includes computer readable program code configured to receive input of a name of at least one tag into an information object; query at least one external tag repository for the at least one tag; responsive to receiving a match from the at least one external tag repository, retrieve content identified by the at least one tag from the at least one external tag repository; and incorporate the content into the information object.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
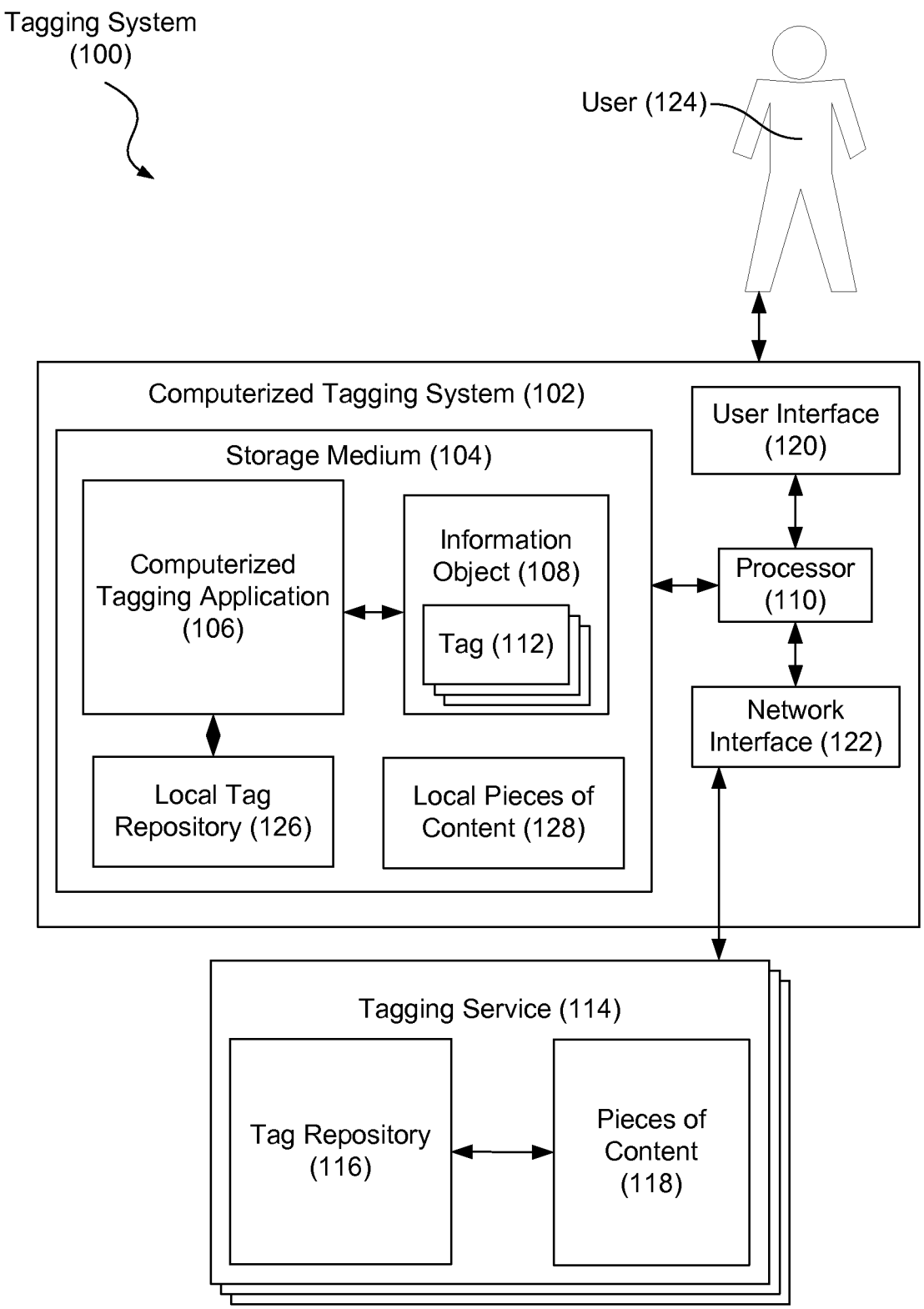
FIG. 1 is a diagram of an illustrative dynamic tagging system, according to one embodiment of principles described herein.

As mentioned above, providing all the information necessary to fill out various electronic forms such as electronic documents, emails, meeting invitations etc. can often be a time consuming task. The task becomes especially time consuming if information needs to be gathered from a relatively wide variety of sources. For example, writing an email to a group of people can involve gathering information from contact lists, mapping websites, and other sources of information. One tool used to assist people in such tasks is a tag. A tag is a keyword or term that is used to represent or identify a piece of content such as a web address, an electronic file, an image, or a list of variables. Various tagging services provide links between tags and the pieces of content they identify. For example, an internet search engine may provide a tagging service in which user created keywords may identify websites, images, videos, etc. Although tags can be used to save time in some circumstances, they are often limited to a specific data type or to a specific service.

The present specification relates to a dynamic tagging application. According to one illustrative embodiment, a dynamic tagging application may allow a user to enter tags into data fields of various information objects such as emails, meeting invitations, blogs, and wiki entries. The dynamic tagging application may then search a variety of tag repositories from different tagging services to provide information to the user for entry into the information object in which a tag was entered. Some tags may point to multiple data types. The data type retrieved by the computerized tagging application may be determined by the data field in which the tag was entered or an identifier associated with the tag. A dynamic tagging system embodying principles described herein will allow a user to quickly and efficiently complete information objects requiring information from a variety of sources.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "information object" refers to an electronic file or entity such as a text file, a meeting invitation, an email, etc. The term "tag" refers to a keyword or term assigned to a piece of content such as a bookmark, a Uniform Resource Locator (URL), electronic file, image, etc. The phrase "materializing a tag," refers to the process of transforming the keyword or term into the piece of content the tag identifies, thus allowing the content to be viewed by a user. The term "tagging service" refers to an application or Internet website that provides and materializes tags. A "tag repository" refers to a data structure containing a list of tags and references to the pieces of content they identify.

Referring now to the figures, FIG. 1 is a diagram of an illustrative dynamic tagging system (100). According to one illustrative embodiment, the dynamic tagging system (100) may include a computerized tagging system (102) having a storage medium (104) including a computerized tagging application (106), an information object (108) able to receive tags (112), and a local tag repository (126) linking tags to local pieces of content (128). The computerized tagging system (102) may further include a user interface (120), a processor (110), and a network interface (122). The network interface may allow the computerized tagging system (102) to communicate with external tagging services (114). Each tagging service may have a tag repository (116) linking tags to pieces of content (118).

The computerized tagging application (106) may provide a mechanism to materialize tags (112) entered into an information object (108). As mentioned above, an information object (108) may include, but is not limited to, an email, a text document, an electronic form, a meeting invitation, a blog, or a wiki entry. A variety of computer programs are designed to open and/or operate on the information objects mentioned above. In one embodiment, the computerized tagging application (106) may be designed to interact with the programs operating and/or opening the information objects (108). This will allow the computerized tagging application to identify tags (112) placed into an information object (108) and materialize them.

Tags (112) are often materialized through use of a tag repository. A tag repository is a list of tags (112) and references to the information or content identified by each tag. For example, a tag (112) with the name "weather" may reference one or more websites associated with weather. It may also reference current data related to the weather such as temperature and other weather conditions. Tags are often user created. This means that a user would have to name a tag and identify one or more pieces of content which the tag will reference. Users may share their tags with other users. In one embodiment, the computerized tagging system may include a local tag repository (126). This local tag repository (126) may contain a list of user created tags identifying local pieces of content (128). Local pieces of content (128) may include image, text, or video files stored on a local storage medium (104).

The computerized tagging system (102) may include a processor (110), a user interface (120), and a network interface (122). The processor may be used to execute various computer program code associated with the computerized tagging application (106). The user interface may be used to allow a user (124) to interact with the computerized tagging application to perform a variety of tasks. These tasks may include, but are not limited to, creating tags, modifying tags, engage various options associated with the computerized tagging application (106), and entering tags (112) and other data into information objects (108). The network interface (122) may allow the computerized tagging system (102) to communicate with other computer systems. These other computer systems may be used to obtain information and content, and interact with external tagging services (114).

The computerized tagging system (102) may interact with a variety of external tagging services (114) to search tag repositories (116) and collect pieces of content (118) from a variety of sources. Many external tagging services (114) allow users to create their own tags (112). The computerized tagging application (106) may be configured to search only tags (112) created by a specific user, or search all tags (112) available from various tagging services (114).

Figure 2A:
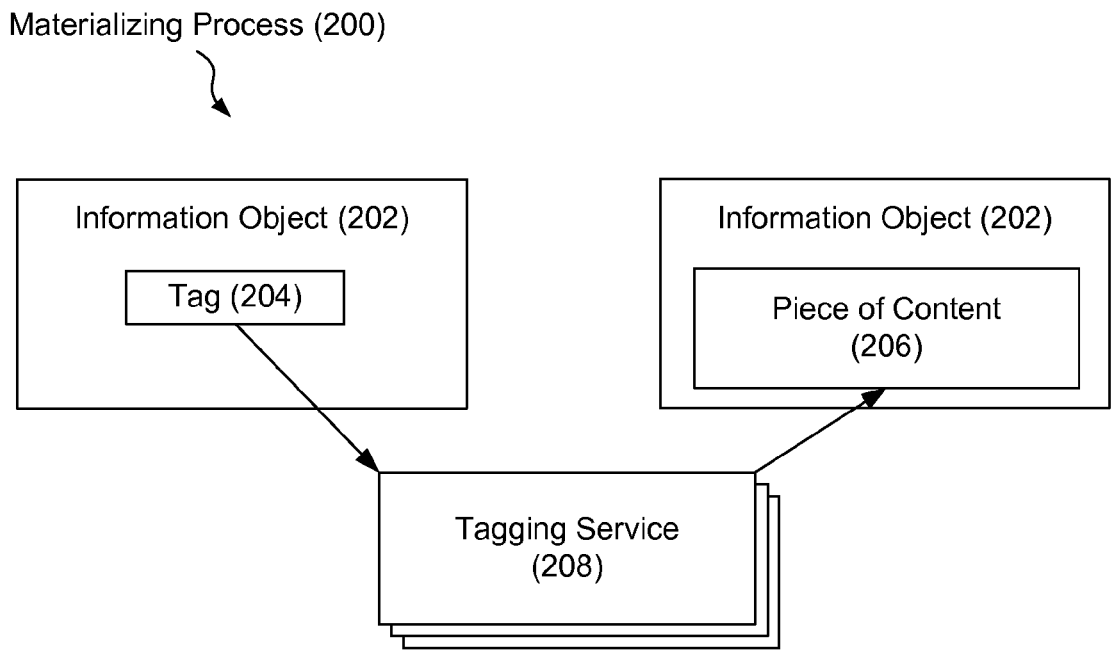
FIG. 2A is a diagram showing an illustrative process for materializing tags, according to one embodiment of principles described herein.

As mentioned above, a tag is materialized to allow a user to view the pieces of content identified by the tag. FIG. 2A is a diagram showing an illustrative materializing process (200). According to one illustrative embodiment, a tag (204) entered in to an information object (202) retrieves content from one or more tagging services (208). When the tagging service (208) receives the tag (204), the tagging service (208) may search its tag repository to find references to pieces of content (206) identified by the tag (204). The tagging service (208) may then send the piece of content (206) back to the computerized tagging application. The computerized tagging application may then either embed the retrieved piece of content (206) within the information object, or place a reference to the piece of content (206) within the information object (202). The piece of content (206) may then be materialized.

In one embodiment, a word or term typed into an information object (202) may be identified as a tag by a marking character or string of marking characters. The marking character may be any symbol or character that is not typically used with regularly used words. For example, and '&' symbol placed before a term in a manner such as "&friends" may indicate that the word "friends" is a tag. In a further example, a tag may be identified by a character both before and after the word such as "<friends>."

Figure 2B:
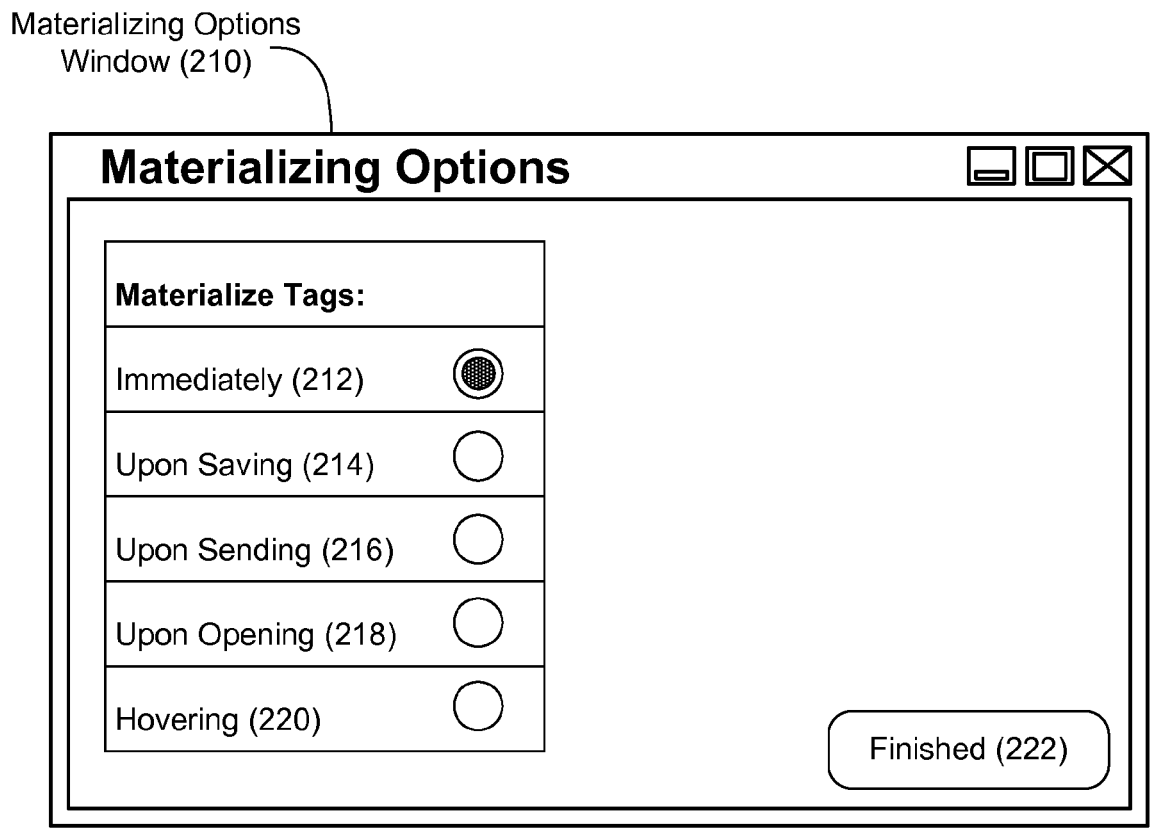
FIG. 2B is a diagram of an illustrative materializing options window of an illustrative user interface, according to one embodiment of principles described herein.

It is not necessary that the materializing process (200) take place immediately upon entering a tag (204) into an information object (202). FIG. 2B is a diagram of an illustrative materializing options window of an illustrative user interface. According to one illustrative embodiment, a user interface for a computerized tagging system may include a materializing options window (210) which may allow a user to choose when a tag (204) should be materialized. A user may choose from a number of materializing options including, but not limited to, immediately (212), upon saving (214), upon sending (216), upon opening (218), and when hovering (220). The materializing options window may have a "finished" button (222) allowing a user to indicate when they have chosen an option.

If a user chooses to have the computerized tagging system materialize tags immediately (212), the tag (204) will be replaced with the piece of content (206) it identifies as soon as it is entered into an information object (202). In this case, once a word has been completed and contains the appropriate marking characters, it will be materialized immediately.

If a user chooses to have the computerized tagging system materialize tags upon saving (214), the tag (204) will be replaced with the piece of content (206) it identifies once the information object (202) is saved. In this case, a set of tags may exist throughout the information object but not be materialized until the user chooses to save the information object.

If a user chooses to have the computerized tagging system materialize tags upon sending (216) an information object, the tag (204) will be replaced with the piece of content (206) it identifies as soon as it is sent or submitted to another entity. This option may be used for information objects (202) such as emails, meeting invitations, or wiki entries. In this case, the tags will materialized once the user sends or submits the information object (202) and not before.

If a user chooses to have the computerized tagging system materialize tags upon opening (218), the tag (204) will be replaced with the piece of content (206) it identifies as soon as a previously saved information object is opened. This type of option may be used for text or spreadsheet documents which are commonly saved and reopened.

If a user chooses to have the computerized tagging system materialize tags when a tracking pointer such as a mouse pointer is hovering (220) over the tag (204), the tag (204) will be replaced with the piece of content (206) it identifies when it is being hovered over. This may be useful for tags (204) identifying smaller data types. For example, a tag (204) may identify an image file. When a tracking pointer hovers over the tag, the image may appear in place of the tag (204).

Figure 3A:
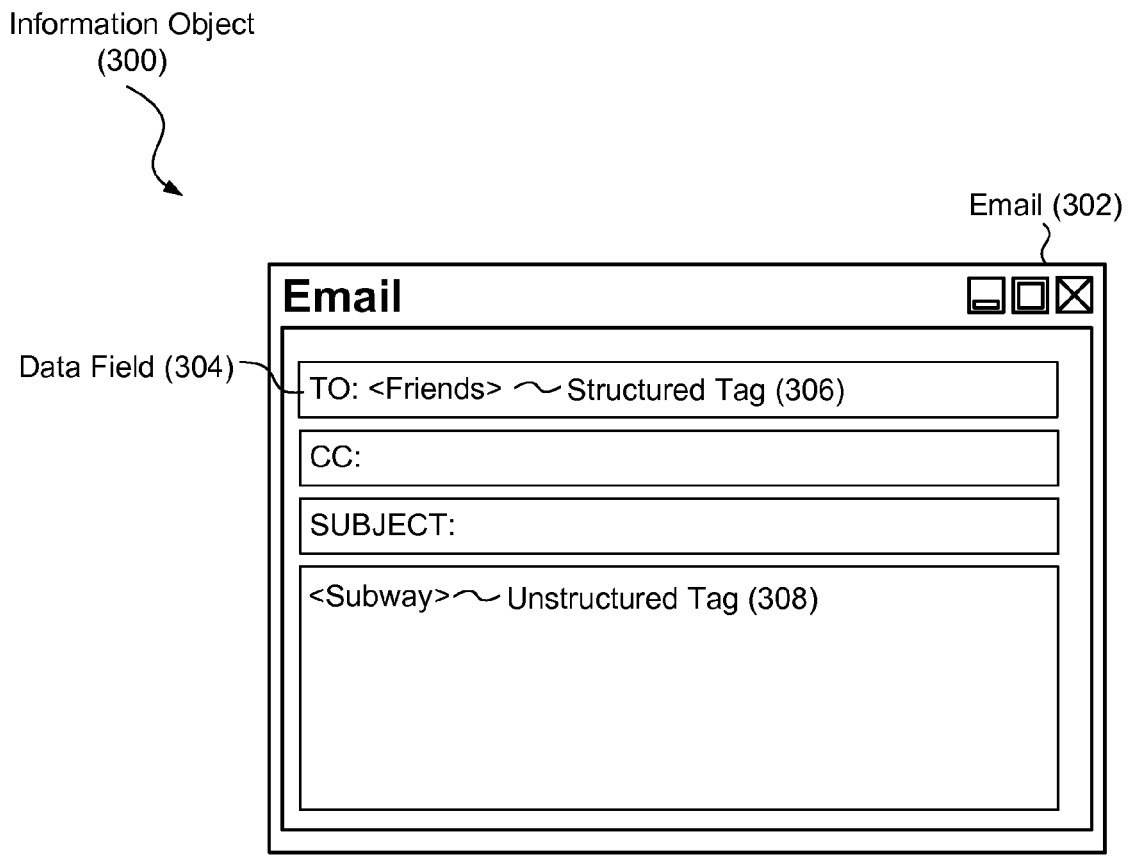
FIGS. 3A and 3B are diagrams of illustrative information objects having tags therein being materialized, according to one embodiment of principles described herein.
Figure 3B:
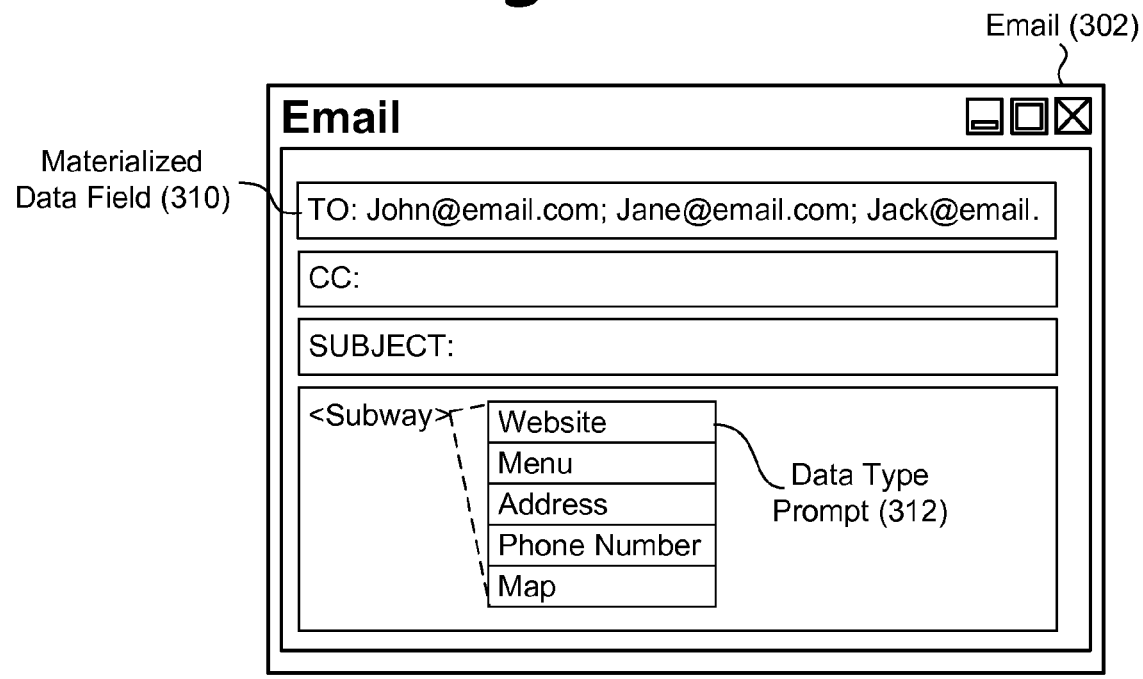

FIGS. 3A and 3B are diagrams of illustrative information objects having tags therein being materialized. According to one illustrative embodiment, an example of an information object may be an email (302). A standard email (302) includes a multiple of data fields, including a "to" field, a "cc" field, a subject field and a text body field. In one embodiment, a structured tag may be entered into the "to" field. Additionally or alternatively, an unstructured tag (308) may be entered into the text body field. The structured tags (306) and the unstructured tags (308) may be materialized differently according to their structure or lack thereof.

A structured tag may refer to a tag that is entered into a data field requiring a specific data type. The structured tag (306) shown in the example illustrated in FIG. 3 is placed into a data field requiring email addresses. Therefore, the dynamic tagging application may know to materialize the tag into a list of friends email address.

Alternatively, a structured tag may refer to a tag that is entered into a data field which accepts multiple data types; however, the user may place a specific marking character with the tag to indicate a specific data type with which the tag should be materialized. For example, a tag "<friends#email>" may be a tag that will materialize into a friends email list, even though other data types such as address or phone number may be associated with the friends list.

An unstructured tag (308) may refer to a tag which does not specify a particular data type, nor is it entered into a field accepting only a particular data type. In one embodiment, when an unstructured tag (308) is entered into a data field, a data type prompt (312) may appear allowing the user to indicate a specific data type. For example, if the tag "<subway>" is entered into a data field with no marking string of characters identifying a specific data type, a data type prompt may appear to ask the user which of the available data types to choose from. In the example illustrated in FIG. 3, the available data types may include a website or URL for Subway, Subway's menu, the address of the nearest Subway, the phone number of the nearest Subway, and a map including directions to the nearest Subway. In one embodiment, a user may be able to choose multiple data types to be materialized by the tagging system.

Figure 4:
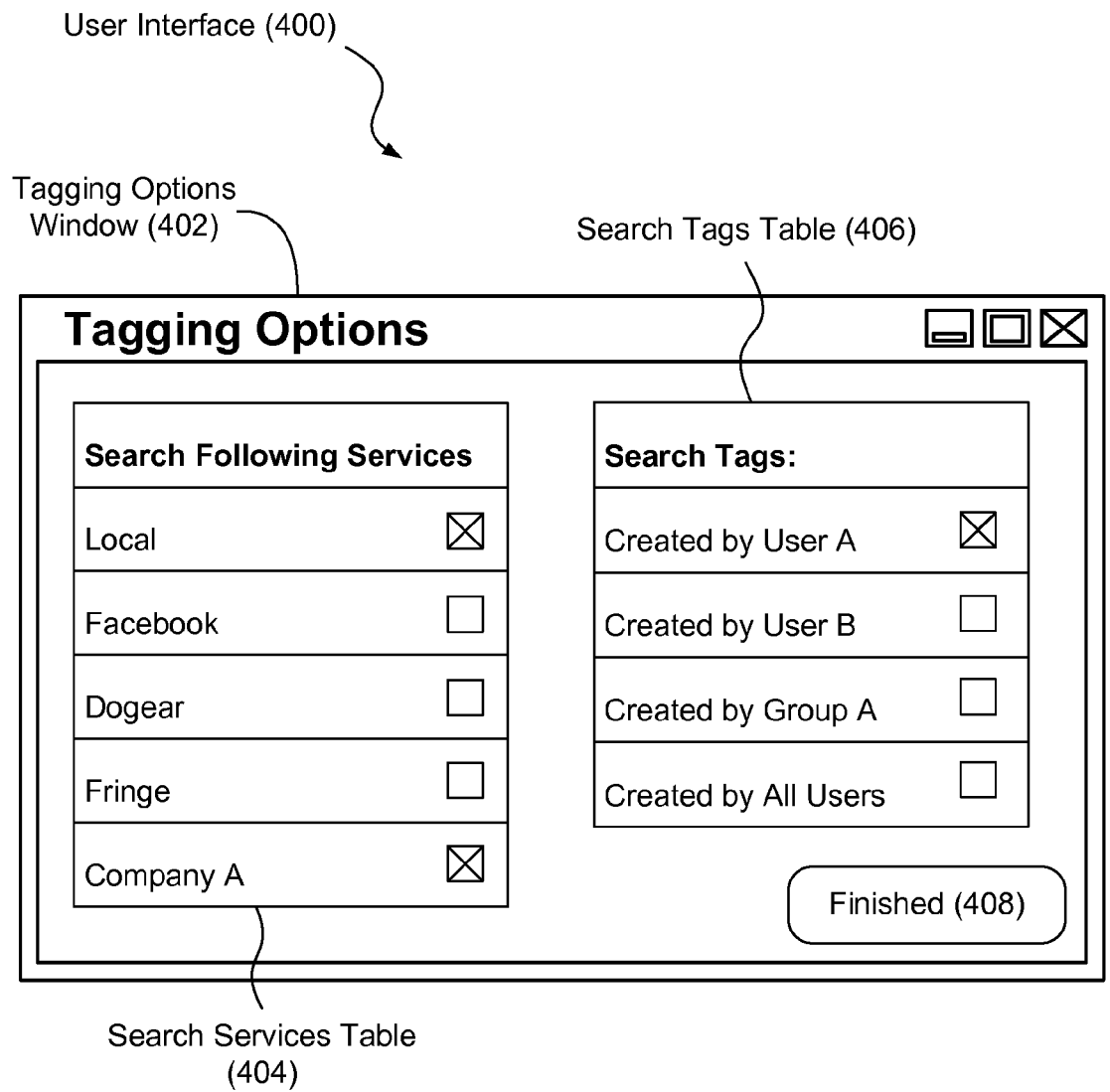
FIG. 4 is a diagram showing an illustrative tagging options window of an illustrative user interface, according to one embodiment of principles described herein.

FIG. 4 is a diagram showing an illustrative tagging options window (402) of an illustrative user interface (400). According to one illustrative embodiment, a tagging options window may include a search services table (404), a search tags table (406), and a "finished" button (408). The "finished" button (408) may be used to indicate that a user has completed selecting his or her desired options.

In one embodiment, a tagging options window (402) may include a search services table (404). The search services table (406) may allow a user to select among several tagging services, including local user created tags. When a tag is entered into an information object, the computerized tagging application may search only the tag repositories of the tagging services selected in the search services table (404). For example, a user may only want to search locally created user tags and tags created by a particular company, possibly an employer of the user. Additionally or alternatively, the computerized tagging application may be set to include online social networking sites such as Facebook in the tag searches.

In one embodiment, a tagging options window (402) may include a search tags table (406). The search tags table (406) may allow a user to select which user created tags to search for in the various tag repositories. A computer system may be used by multiple persons, and a user may or may not wish to search among other local user created tags. In addition their may be tag repositories on a local company network having tags created by employees of that company. The search tags table (406) may allow a user to choose to search from tags created by certain groups or organizations.

Figure 5:
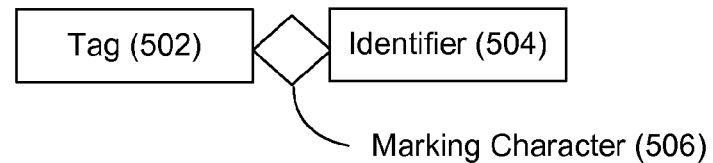
FIG. 5 is a diagram showing an illustrative identifier placed on a tag to denote which tagging service to search, according to one embodiment of principles described herein.

The options selected in the tagging options window (402) may indicate default search settings. However, a user may desire that a specific tag search a specific tagging service. FIG. 5 is a diagram showing an illustrative identifier (504) placed on a tag (502) to denote which tagging service to search. According to one illustrative embodiment, when a user enters a tag into an information object, the user may add a services identifier (504) to the tag (502). In one embodiment, a user may associate a marking character with the services identifier. The marking character may indicate to the computerized tagging application that a particular string of characters is a service identifier (504) and not part of the tag (502). In one example, a marking character may be a '#' symbol. FIG. 5 illustrates an example (508) of a tag having a marking character (506) between the tag (502) and the service identifier (504).

Figure 6:
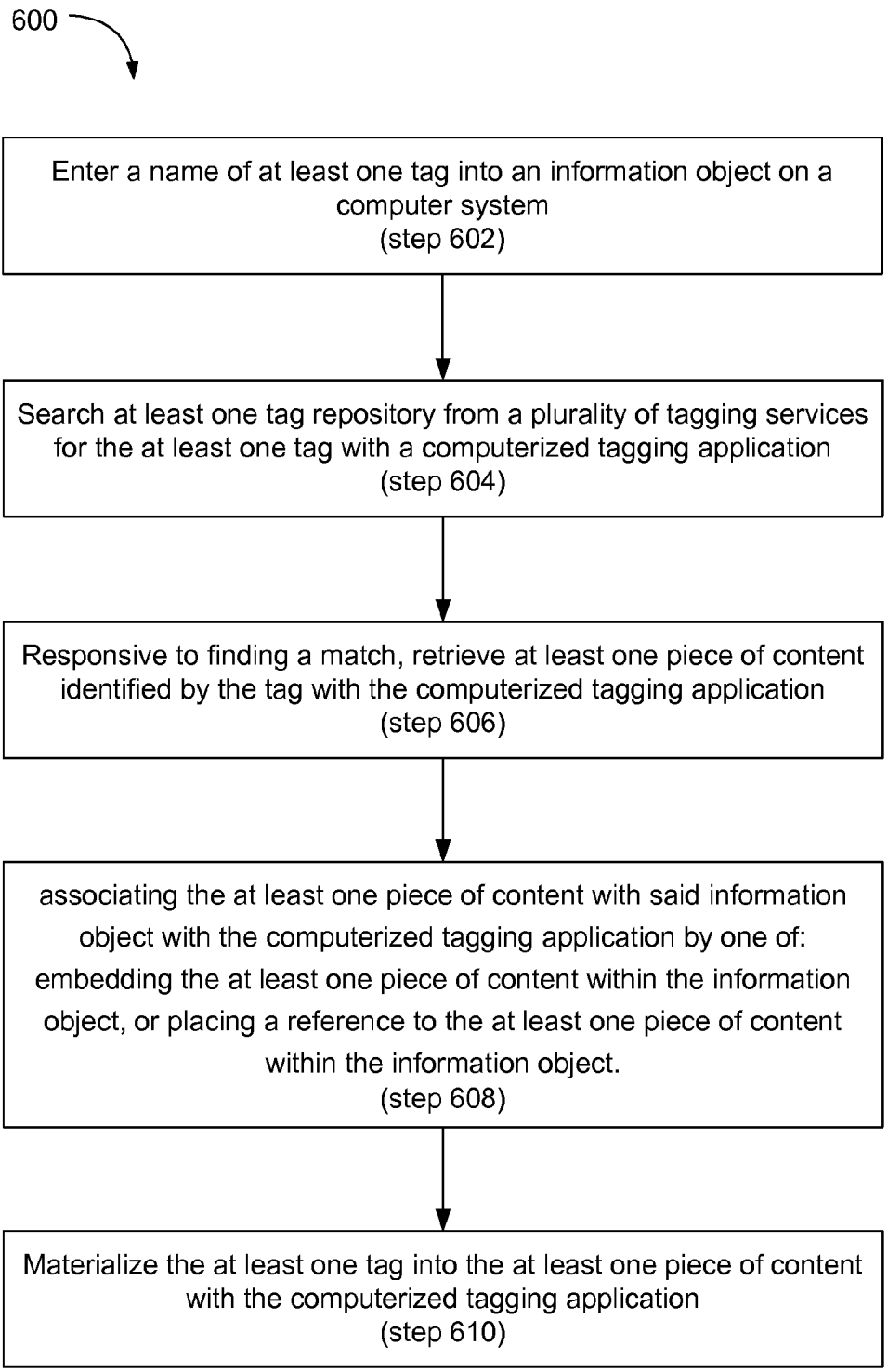
FIG. 6 is a flowchart showing an illustrative process for dynamic tagging, according to one embodiment of principles described herein.

FIG. 6 is a flowchart showing an illustrative process for dynamic tagging. According to one illustrative embodiment, the name of at least one tag may be entered (step 602) into an information object on a computer system. At least one tag repository from a plurality of tagging services for the at least one tag may be searched (step 604) with a computerized tagging application associated with the computer system. Responsive to finding at least one match in the at least one repository from a plurality of tagging services, at least one piece of content identified by the at least one tag with the computerized tagging application may be retrieved (step 606). The at least one piece of content may be associated (step 608) with the information object with the computerized tagging application by either embedding the at least one piece of content within the information object, or placing a reference to the at least one piece of content within the information object. The tag may be materialized (step 610) with the computerized tagging application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for dynamic tagging, the method comprising:
receiving input of a name of at least one tag into a data field of an information object implemented by an application that is executed by a computer system that is in communication with at least one tag repository external to said application, said data field comprising a data type;

querying said at least one tag repository external to said application for said at least one tag with said application executed by said computer system;

responsive to receiving at least one match from said at least one tag repository, retrieving content identified by said at least one tag from said at least one tag repository, the retrieving content conforming to said data type from said at least one tag repository;

incorporating said content into said information object with said application; and replacing said name of said at least one tag in said information object with said content identified by said at least one tag responsive to at least one of: said information object being saved, said information object being sent to another user, and said information object being opened.

2. The method of claim 1, in which incorporating said content into said information object comprises at least one of: embedding said content within said information object and placing a reference to said content within said information object.

3. The method of claim 1, in which incorporating said content into said information object comprises replacing said name of said at least one tag in said information object with said content identified by said tag, said content being visible to a user of said application.

4. The method of claim 3, further comprising replacing said name of said at least one tag with said content identified by said at least one tag immediately upon receiving said input of said name of said at least one tag into said information object.

5. The method of claim 1, further comprising receiving input identifying said at least one tag repository in connection with said input of said name of said at least one tag.

6. The method of claim 1, further comprising, responsive to finding a match in said at least one repository that conforms to said required data type, automatically entering said content into said data field of said information object.

7. The method of claim 6, in which said tag identifies multiple data types applicable to said content.

8. A method for dynamic tagging, the method comprising:
receiving input of a name of at least one tag into an information object implemented by an application that is executed by a computer system that is in communication with at least one tag repository external to said application;

querying said at least one tag repository external to said application for said at least one tag with said application executed by said computer system; and responsive to receiving at least one match from said at least one tag repository, retrieving content identified by said at least one tag from said at least one tag repository;

incorporating said content into said information object with said application;

in which receiving said input of said name of said at least one tag into said information object further comprises receiving said input of said name into a data field of said information object, said data field comprising a data type; and in which said retrieving content identified by said at least one tag from said at least one tag repository further comprises retrieving content conforming to said data type from said at least one tag repository;

said method further comprising responsive to finding a match in said at least one repository that conforms to said required data type, automatically entering said content into said data field of said information object;

in which said tag identifies multiple data types applicable to said content;

said method further comprising, responsive to finding a match in said at least one repository, prompting said user to select which of said multiple data types to use when retrieving said content identified by said at least one tag from said at least one tag repository.

9. The method of claim 1, in which said querying said at least one tag repository external to said application for said at least one tag further comprises querying said at least one tag repository only for tags created by a specific user in said at least one tag repository.

10. The method of claim 1, in which said querying said at least one tag repository external to said application for said at least one tag further comprises querying said at least one tag repository only for tags belonging to a predetermined subgroup of tags stored within said tag repository.

11. A method for dynamic tagging, the method comprising:
receiving input of a name of at least one tag into a data field of an information object implemented by an application that is executed by a computer system that is in communication with at least one tag repository external to said application, said data field comprising a data type;

querying said at least one tag repository external to said application for said at least one tag with said application executed by said computer system; and responsive to receiving at least one match from said at least one tag repository, retrieving content identified by said at least one tag from said at least one tag repository, the retrieving content conforming to said data type from said at least one tag repository;

incorporating said content into said information object with said application; and said user placing an identifier on said at least one tag, said identifier identifying a specific tagging service or group of services included in said at least one tagging service.

12. A dynamic tagging system comprising:
a computer system comprising:
at least one processor configured to execute software stored on a computer readable storage medium;

said software being configured to cause said at least one processor to, upon execution of said software:

allow a user to enter a name of at least one tag into a data field of an information object implemented by an application, said data field comprising a data type;

query at least one tag repository external to said application for said at least one tag;

responsive to receiving at least one match from said at least one repository, retrieve content identified by said at least one tag from said at least one tag repository, the retrieving content conforming to said data type from said at least one tag repository; and incorporate said content into said information object;

in which said at least one tag identifies multiple data types applicable to said content, and said software is further configured to prompt said user to select a specific data type for which to query said at least one tag repository.

13. The system of claim 12, in which incorporating said content into said information object comprises at least one of: embedding said content within said information object and placing a reference to said content within said information object.

14. The system of claim 12, in which said incorporating said content into said information object comprises replacing said name of said at least one tag with said content, said content being displayed to said user of said application.

15. The system of claim 12, in which said at least one tag conforms to a data type specified by a data field in said information object responsive to said name of said tag being entered into said data field by said user.

16. The system of claim 12, in which said software is further configured to allow said user to identify said at least one repository in connection with said user entering said name of said at least one tag into said information object.

\* \* \* \* \*